United States Patent [19]

Killmeyer, deceased et al.

[11] 4,296,060
[45] Oct. 20, 1981

[54] METHOD OF PRODUCING A PULTRUDED, FIBER REINFORCED ROD

[75] Inventors: Charles W. Killmeyer, deceased, late of Braddock Hills, Pa.; by Elizabeth A. Killmeyer, administrator, Pittsburgh, Pa.; James E. Lane, Henrietta, N.C.; Leslie L. Taylor, Jr., Forest City, N.C.; Joe T. Pearson, Lawndale, N.C.

[73] Assignee: PPG Industries, Inc., Pittsburgh, Pa.

[21] Appl. No.: 166,522

[22] Filed: Jul. 7, 1980

Related U.S. Application Data

[62] Division of Ser. No. 101,990, Dec. 7, 1979.

[51] Int. Cl.³ .............................................. B29D 1/00
[52] U.S. Cl. .................................. 264/137; 264/295; 264/339
[58] Field of Search ................. 264/137; 264/295, 339

[56] References Cited

U.S. PATENT DOCUMENTS 3,283,050 11/1966 Boggs ................................ 264/137
3,441,637 4/1969 Davis ............................. 264/295 X
3,895,896 7/1975 White ............................. 264/137 X

FOREIGN PATENT DOCUMENTS 2500375 7/1976 Fed. Rep. of Germany.

Primary Examiner—Thomas P. Pavelko
Attorney, Agent, or Firm—John E. Curley

[57] ABSTRACT

A system for forming twisted pultruded fiber reinforced rods is disclosed. In the system of the invention fibers are coated with a resin, drawn through a shaping die and then after at least partially curing, the rod is simultaneously twisted and pulled through the coater by opposed pulling surfaces that rotate as they pull to twist said rod.

7 Claims, 5 Drawing Figures

METHOD OF PRODUCING A PULTRUDED, FIBER REINFORCED ROD

This is a division of application Ser. No. 101,990, filed Dec. 7, 1979.

BACKGROUND OF THE INVENTION

1. Field of the Invention

This invention relates to a system of forming fiber reinforced organic resins. Particularly it relates to a system for forming twisted pultruded articles reinforced with glass fibers.

2. Prior Art

Reinforcing members formed of fiber reinforced organic resins are quite valuable because of their high strength to weight ratios. Thus, fiber reinforced members having uniform surfaces are typically employed in the reinforcement of concrete, plastics and the like.

A problem associated with the reinforcement of materials such as concrete with fiber reinforced resinous rods is the lack of a mechanical bond between the concrete and exterior surface of the rod. Thus, it is desirable to form a reinforcing member having one or more grooves and/or protrusions on its surface to provide regions for mechanical bonding between the rod surface and the material or matrix to be reinforced.

However, with the known techniques for forming continuous fiber reinforced plastics, the molding of ridges and/or grooves into a reinforcing member severely reduces the strength of the member. In the past, in order to provide ridges or grooves on the surface of a continuous fiber reinforced member, the continuous fibers would be severely bent into the ridges or out of the grooves from their normal longitudinal position along the rod resulting in ridges which have a scarcity of fiber reinforcement therein or reinforcement in an undesired direction. In either case, the reduced amount of continuous fiber reinforcement or the severely bent fibers in the ridges or the reorientation of fibers to form the grooves in the surface substantially reduces the strength of the member at these points. Typical of the prior art reinforcing members having uneven surfaces are those found in U.S. Pat. Nos. 2,510,693; 2,949,054; and 3,859,409.

It is desirable, therefore, to produce a fiber reinforced, resinous rod-like reinforcing bar in which one or more grooves and/or ridges are provided on the surface of the rod along its length to provide mechanical bonding between the reinforcing member and material or matrix to be reinforced and in which the reinforcing fibers in the ridges or surrounding the grooves generally follow the pattern of the ridges and grooves on the surface of the rod to provide higher strength to the reinforcing member than has been previously possible. These grooves and/or ridges are continuous and preferably generally helical in configuration.

Pultrusion is a known method for producing continuous fiber reinforced organic resin articles having uniform shapes along their length. Typical of the known pultrusion processes are those found in U.S. Pat. Nos. 2,721,599; 2,625,498; 3,895,896; and 3,979,493. An inherent problem of the known pultrusion methods is their inability to form shaped articles having other than a regular longitudinal shape. Pultrusion is, however, becaue of its continuous nature, an effective way of producing continuous fiber reinforced stock materials. It would be highly desirable, therefore, to provide a pultrusion method and apparatus capable of producing articles having shapes other than the uniform longitudinal shapes commonly associated with pultrusion.

The U.S. Pat. No. 3,283,050 to Boggs discloses a method and apparatus for making threaded fiber reinforced resin articles. In the system of Boggs the threaded reinforced member is unscrewed from a rotating mold as it is formed. The reinforcement does not follow the flights of the screws.

In the U.S. Pat. No. 3,441,637 to Davis there is disclosed a method for making drink stirrers that comprise a hollow body having a rib on its surface. The hollow plastic tube is twisted as it passes through a heated bath. There are no reinforcing fibers present.

U.S. Pat. No. 2,434,533 to Wurzburger discloses the formation of imitation filaments and ropes and suggests the use of a rotating shaping orifice at column 3, lines 58–75.

There has been disclosed in U.S. patent application, Ser. No. 867,852, filed Jan. 9, 1978, a system for forming twisted reinforced pultruded rods. However, there remains a need for a system that will allow continuous production of uniform twisted rods without the difficulties of over twisting of some portions during forming, inability to run for long periods of time and non-uniform twist.

BRIEF DESCRIPTION OF THE INVENTION

It is an object of this invention to overcome difficulties of prior processes.

It is another object of this invention to form continuously filament reinforced resin rods that are twisted with fibers uniformly following the protrusions.

It is another object of this invention to form uniform twisted pultruded rods.

It is an additional further object of this invention to form pultruded twisted rods without build-up of resin in the dies.

It is another object of this invention to form low cost twisted pultruded rods.

These objects of the invention are generally accomplished by providing apparatus and a process for using said apparatus wherein filament ends are pulled through a resin bath directly into a die which is heated to partially cure the resin. The rod exiting the die is partially cured. After exiting the die the partially cured rod passes through heater sections which further cures the rod. After exiting the heater sections the rod is cured to such an extent that it is not deformable by the pressure required at the pulling device to pull the fibers through the bath and the shaping die. After exiting the heaters the rod is grasped by opposable wheels which provide the pulling force and at the same time are rotated around the path of the rod so as to twist the rod. The twist in the rod appears at the point immediately beyond where the shaped partially cured rod leaves the die.

DETAILED DESCRIPTION OF THE INVENTION

The system of the invention provides numerous advantages over prior art systems. The system of the invention is able to form continuous rods without the need for shutdowns to rethread filaments or clean the molds. The system of the invention provides a rod of uniform twist. The system of the invention further provides a method of cheaply forming and twisting fiber reinforced plastic rod. The system of the invention may be better understood by reference to the attached FIGS. 1a, 1b and FIG. 2.

Figure 1A:
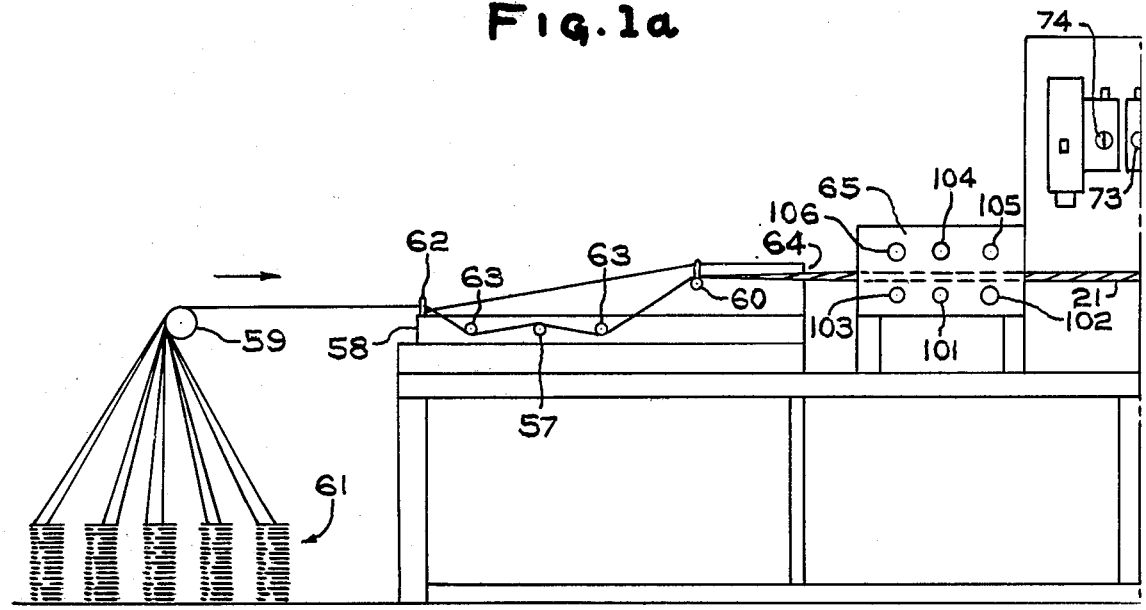
FIGS. 1a and 1b are a side view of apparatus for forming twisted continuous filament reinforced plastic rods.
Figure 1B:
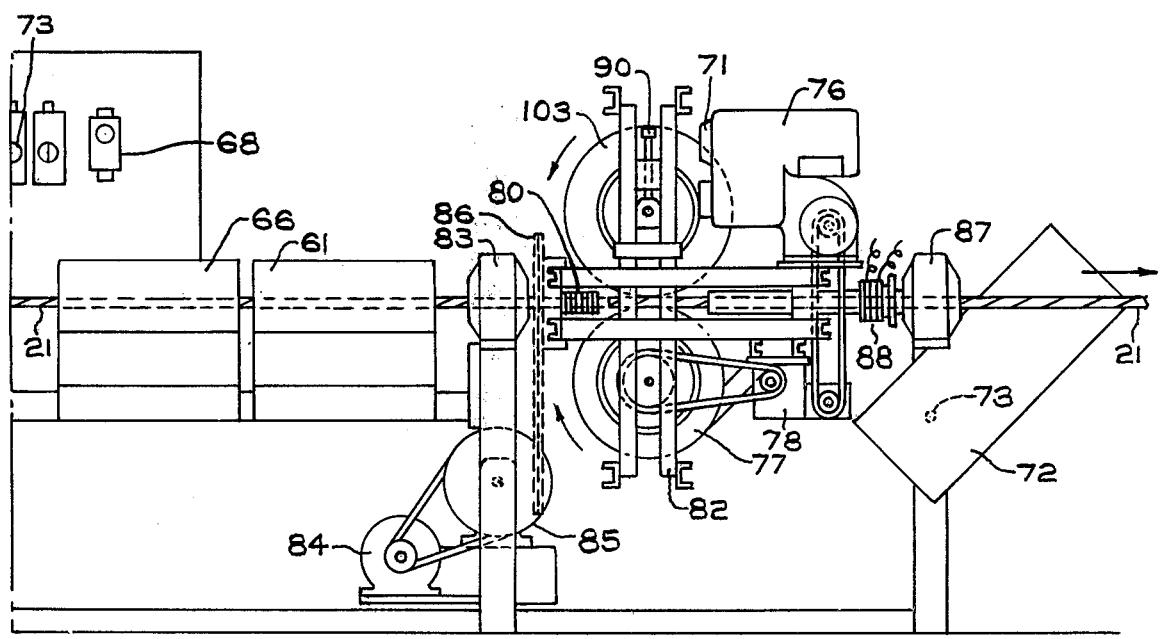

The operation of this system is illustrated in FIGS. 1a and 1b and begins with the drawing of strands from roving packages 61 over a bar 59 and into the dip bath 58. While illustrated with the roving packages sitting on the floor it is also within the invention to draw strands from roving packages in coils or from other sources such as forming packages. The strands enter the dip bath through a multiplicity of openings in bar 62 where they pass under bars 63 and over bar 57 and through comb 60. While the number of strands and the number of lead offs in the comb varies with the size of the article being pultruded it has been found that when an article having a cross-section equivalent to that of a ⅜" diameter circle is formed about 130 ends may be pulled through the bath. The bath contains resin such as a polyester or other thermally curing thermoset resin. The strands exit the dip bath through orifice 64 which has a cross-section slightly larger than the entrance of die 65. Die 65 has a cross-section which is desired in the finished rod. The die is heated by heaters 101, 102, 103, 104, 105, and 106. These heaters may be individually controlled or pairs of heaters may be commonly controlled. In one preferred embodiment heaters 103 and 106 are controlled together while the remaining four heaters are controlled by a separate control. Controls for heaters 101, 102, 104 and 105 are by rheostat 73 while the temperature of heaters 103 and 106 is controlled by rheostat 69. The rod 21 exiting from die 65 is, after a short distance, poured into heaters 61 and 66 which cures the rod to such a degree that it will not be substantially deformed by the pulling and twisting forces to which the rod is subjected after leaving heater 61. Heater 61 and heater 66 may be controlled by rheostat control 74. The heat source in heaters 61 and 66 would normally be bar heaters. In the case of some resin systems it might be desirable to cure by a means other than thermocuring such as microwave curing. Further, in the instance of thermoplastic resin the heaters 61 and 66 and the heaters in the die 65 would be replaced with coolers which would cool the thermoplastic resin to a temperature at which it is solid enough to withstand the pulling and twisting forces. After exiting from curing devices 66 and 61, the rod 21 passes through pillow block 83 and enters the twisting device which is suspended and rotates on pillow blocks 83 and 87. The rod 21 is pulled by wheels 103 and 77. The opposed small inflatable wheels 80 serve to keep the rod centered between the larger pulling and twisting wheels 103 and 77. The pulling draws the rod 21 from the bath 58 and through the die 65. Additionally as the pulling wheels 103 and 77 rotate as indicated to pull the rod 21 the wheels themselves are rotated in the pillow blocks 83 and 87 by motor 84 through transmission and drive chains 85 driving chain drive 86. The twisting device indicated in FIGS. 1b and 2 from different sides contains a motor 76 which drives pulling wheel 77 through transmission 78. The speed of the motor further may be regulated by speed control 71 on the motor. The pick-up device for electricity to motor 76 is indicated by 88 which is a rotating contact for electrical power to motor 76. Guard 72 pivoting on point 73 guards the electrical device. The pressure of wheel 103 against drive wheel 77 is controlled by tightening device 90. The rod 21 after it leaves the twisting device through pillow block 87 may be cut to any desired length by cutting means not shown. The twisting imparted by the rotational movement around the axis of rod 21 of wheels 77 and 103 turning rod 21 twists the rod immediately as it leaves die 65. The twist appears here as that is the most pliable area available for the twist to appear as the rod is more cured at later points in its movement. The twisting device shown has a balance weight 102 which balances the weight of the motor 76 to reduce vibrational forces and stress on the bearings of the pillow blocks 83 and 87.

Figure 3:
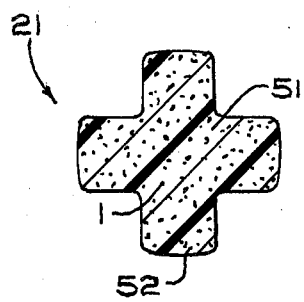
FIG. 3 is a cross-section of a rod produced by the system of the invention.
Figure 4:
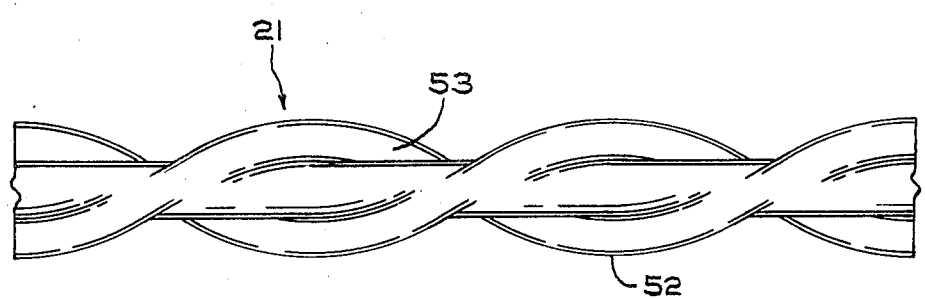
FIG. 4 is a perspective view of a rod produced by the system of the invention.

A preferred cross-section for the rod of the invention is that shown in FIG. 3 which is generally in the form of an X with four flights 52 extending from a central core 51. The fiber glass reinforcement 1 is generally evenly distributed within the cross section. Further, the continuous reinforcement strands which are in the flights 52 remain in these flights throughout the twisting and curing of the rod. FIG. 4 is an illustration of a twisted rod of cross-section such as in FIG. 3.

The following examples set forth the operation of the system of the instant invention for production of a twisted fiber glass reinforced plastic rod.

EXAMPLE I

Figure 2:
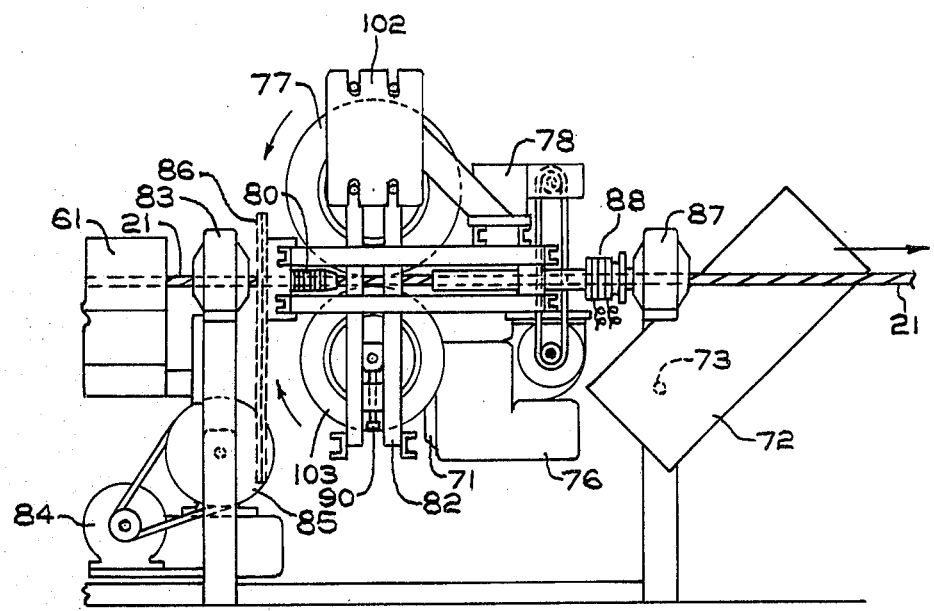
FIG. 2 is a side view of the twisting and pulling mechanism of the apparatus of the invention.

A run using the apparatus as illustrated in FIGS. 1a, 1b and FIG. 2 was performed. The resin was 100 parts polyester (Selectron 5066-PPG Industries, Inc.) two parts BTP catalyst (benzoyl peroxide paste of Pennwalt Chemical Corp.) and two parts of the mold release of Example I. The roving was of the same type as Example I with 116 ends of fiber glass. The pull speed was about 1 foot per minute with a rate of twist of about one quarter turn per running foot. The die block was maintained at 225° F. with the cure tunnel at 350° F. The product was of good quality with the glass content of about 68% by weight. A problem of resin build-up in the die block appeared after about 40 minutes and the run was stopped. A product of good quality was produced until the run was stopped.

EXAMPLE II

Another performance of the system of the FIGS. 1a, 1b and FIG. 2 was carried out with the pull speed varied between about one foot and 15 inches per minute, a rate of twist was varied from about one quarter to about one half turn per foot. The die block temperature was between about 225° F. and 250° F. and the cure tunnel at about 350° F. The run was made utilizing ends from 121 packages of the roving utilized in Example I. The resin bath was as follows in part by weight: (Dion 8200 Diamond Shamrock) polyester resin 73.5%, UV-9 ultra-violet absorber 0.3%, ASP-400 clay 25%, Zelec mold release (Dupont) 0.5% and catalyst 0.7% (PDO-Pennwalt Chemical Corp.-50%-t-butyl perocotate in diocytl-phthalate). This produced a good quality rod with a glass content of 65% without plugging of the mold.

EXAMPLE III

This run was performed as in Example I except that the resin was in parts by weight as follows: Selectron 5067 polyester (PPG Industries) 72.5%, BTP peroxide 2%, ASP-400 clay filler 25%, Zelec mold release 0.5%. The roving was from 121 packages of the roving of Example I with a pull speed of between about 10" (inches) per minute and 27"0 (inches) per minute wth a rate of twist varied from $\frac{1}{4}$ to $\frac{1}{2}$ turn per foot. The die block was maintained between 225° F. and 275° F. with the cure tunnel temperature time at 400° F. A rod of excellent quality having a glass content of about 61% was formed.

EXAMPLE IV

The apparatus of FIGS. 1a, 1b and 2 is utilized to form a rod starting with 132 T-250 roving ends (Hybon 2079 of PPG Industries, Inc.) which are fed into the dip coating bath through 33 lead orifices. The strands exiting the bath pass through an about $\frac{5}{8}$" (inch) diameter hole where excess resin is wiped from the strands and enters the die that has a cross-section generally like that of FIG. 3 with a diameter across the widest point of $\frac{5}{8}$". This die has a cross-sectional area generally corresponding to the cross-sectional area of the $\frac{5}{8}$" diameter hole at the end of the dip coater. The die is maintained at about 200° F. at the input end and about 275° F. at the output end. The resin in the dip bath is a mix measured in parts by weight as 100 parts polyester resin (Selectron 5067 of PPG Industries, Inc.), 10 parts clay filler (ASP 400 Englehart Mineral and Chemical Company) and 0.5 parts mold release (Zelac U.N. lubricant from Dupont) and two parts benzoyl peroxide paste curing agent. The bar heaters in curing devices 66 and 61 are 375 watt chromalox bar heaters maintained at about 350° F. for about a 40" cure length.

The pull rate is about 23" (inches) per minute. One full twist is applied to about 20 linear inches of the twisted rod. The twist takes place in the area immediately beyond the die. The rod is cured by the bar heaters to a state that it is not deformed by the pulling of the wheels. A product of good quality was produced at about 70% by weight glass. Measurements are by weight and temperatures in Fahrenheit unless otherwise indicated.

While the above examples were performed utilizing polyester resins it is within the scope of the present system, too, to utilize any resin. Typical of suitable resins are epoxy, polyurethanes, polyamides and other thermosetting resins. Thermoplastic resins may be utilized but the system needs to be modified to utilize coolers rather than heaters in order to solidify the resin prior to the pulling period. A preferred resin is polyester as it has demonstrated long life, resistance to corrosion and good bonding properties with fiber glass strands.

The mold release utilized in most of the above examples is believed to be a silicone release agent. However, it is within the invention to utilize any release agent that allows long term use of the system without mold clogging or harm to the rod properties. Typical of mold release materials are silicones, waxes and fluorinated hydrocarbons.

Several of the above examples include the utilization of a clay filler material. The use of a filler material appears desirable to give better visible surface finish to the finished rod. Further the clay apparently acts to aid in cleaning of the mold during pulling of the rod to prevent clogging with cured resin. The filler also acts to reduce the cost of the rod as the clay filler is cheaper than the resin which it replaces. Any filler may be utilized. Typical fillers for resin materials are clays and chopped fibers such as chopped glass. The filler may be varied to give different properties to the finished bars.

Many variations may be made in the practice of this invention without departing from the concept of the system disclosed here. For instance the twisting and pulling functions could be separated. The twisting device could only clamp the rods sufficiently to hold it while twisting took place but not also pull. The pulling device could be located downstream from the twist device. The twist device would need to be able to pull without applying further twist to the rod as it pulled. Additionally, while illustrated as a rod with a generally X shaped cross-section it is, of course, within the invention to create a rod of any cross-section. Further while the rod is considered as desirable for a mine roof bolt or concrete reinforcement as it is within the instant invention to utilize the rod for other purposes such as reinforcing of structural shapes such as boats or motor vehicles. Also, the twisted rods would be suitable for use as posts or barriers.

While the system has been described with a dip coater it is within the invention to coat the strands by other processes such as spraying of resin onto the strands or application by roll coaters. Another variation within the invention is the use of opposed belts or rollers rather than wheels as the griping means for pulling and/or twisting.

Therefore, while the invention has been described with reference to particularly preferred embodiments thereof it is not intended to be limited thereby, except as appears in the accompanying claims.

We claim:

1. An improved method of producing a pultruded, fiber reinforced, resinous rod comprising coating glass fiber continuous strands with resin, pulling the resin-coated continuous glass fiber strands through a shaping zone to provide a rod structure having at least one protrusion on the surface containing resin-coated continuous glass fiber strands, at least partially curing the resin-coated continuous glass fiber strands, passing the at least partially-cured rod through a second zone, rotating the at least partially-cured rod in said second zone relative to said first zone to form a solid rod in which at least a portion of the continuous glass fiber strands follow the contour of at least one protrusion of the rod through the two zones and completely curing the rod; wherein the improvement comprises pulling the rod by rotating opposed surfaces against the rod surface to move the rod through said second zone and simultaneously moving the opposed surface around the axis of the rod continuously to impart twist thereto as the surfaces are exerting pulling forces on the rod.

2. The method of claim 1 wherein said rod is cured to a degree such that it is not substantially deformed by the rotational and pulling forces.

3. The method of claim 1 wherein complete curing of the rod takes place without additional heat being applied to said rod after turning in said second zone.

4. The method of claim 1 wherein said rod structure is partially cured in the shaping zone that provides its cross-section.

5. The method of claim 1 wherein between said shaping zone and said rotating and pulling zone there is an area of partial curing.

6. The improved method of claim 1 wherein said resin is a heat curing resin.

7. The improved method of claim 1 wherein said resin is a thermoplastic resin and said curing is carried out by cooling said resin.

* * * * *